United States Patent [19]

Wirth

[11] Patent Number: 5,369,157
[45] Date of Patent: Nov. 29, 1994

[54] THERMOPLASTIC COMPOSITIONS IMPROVED FIRE PERFORMANCE CONTAINING ALKENYL AROMATAIC POLYMERS

[75] Inventor: René Wirth, Lens, France

[73] Assignee: Atochem, Paris, France

[21] Appl. No.: 173,100

[22] Filed: Dec. 27, 1993

Related U.S. Application Data

[63] Continuation of Ser. No. 632,322, Dec. 21, 1990, abandoned.

[30] Foreign Application Priority Data

Dec. 21, 1989 [FR] France ............... 89 16973

[51] Int. Cl.$^5$ ............... C08K 5/3477; C08K 5/05
[52] U.S. Cl. ............... 524/100; 524/101; 524/387; 524/141; 524/145
[58] Field of Search ............... 524/100, 101, 387

[56] References Cited

U.S. PATENT DOCUMENTS 4,436,854  3/1984  Brandstetter et al. ............... 524/141
4,871,795  10/1989  Pawar ............... 524/387

FOREIGN PATENT DOCUMENTS 0026391  4/1981  European Pat. Off. ............ 524/101

Primary Examiner—Tae H. Yoon
Attorney, Agent, or Firm—John L. Sigalos

[57] ABSTRACT

Thermoplastic compositions containing, per 100 parts by weight of a thermoplastic material containing at least one alkenyl aromatic hydrocarbon polymer or copolymer and, if required, at least one other thermoplastic of elastomeric resin:
(a) from 5 to 30 parts by weight of melamine and melamine isocyanurate,
(b) from 2 to 10 parts by weight of at least one polyol containing at least 4 hydroxyl functions per molecule, and
(c) from 0 to 14 parts by weight of at least one organic ester of phosphoric acid.

A process for their preparation consists of mixing the various constituents at a temperature higher than the softening point of the alkenyl aromatic hydrocarbon polymer or copolymer, between 150° and 200° C., for a duration between 1 and 5 minutes in an internal mixer or extruder.

Articles obtained by transformation of the above compositions are formed having low combustion rates.

8 Claims, No Drawings

THERMOPLASTIC COMPOSITIONS IMPROVED FIRE PERFORMANCE CONTAINING ALKENYL AROMATAIC POLYMERS

This application is a continuation of application Ser. No. 07/632,322 filed Dec. 21, 1990 now abandoned.

BACKGROUND OF THE INVENTION

The present invention pertains to alkenyl aromatic hydrocarbon polymers, copolymers based on alkenyl aromatic hydrocarbons and compositions containing the said polymers and copolymers combined with other thermoplastic or elastomeric polymers, containing combustion retardant agents which do not have halogen atoms.

The polymers and copolymers of alkenyl aromatic hydrocarbons as well as the compositions containing them are well known for their remarkable properties and have become thermoplastics which are widely employed for very diversified applications. Nevertheless, they have mediocre fire resistance performance and burn easily.

It is known to add flame-proofing agents to these polymers, copolymers and compositions. The most commonly employed are comprised of compounds containing at least one halogen atom, generally bromine. The efficacy of these compounds has been widely demonstrated. However, they have the drawback of emitting harmful and corrosive halogen gases when attacked by fire.

It is also known from Japanese publication A-54/85242 to make polystyrene nonflammable by means of 3 to 50 parts by weight of melamine cyanurate per 100 parts by weight of polystyrene.

Also, known from French patent 2,096,230 are injection-moldable thermoplastic composition which are nonflammable and contain at least 60% by weight of melamine and no more that 40% by weight of polystyrene.

Also known from Japanese publication A-54/46250 are compositions containing 30 to 80 parts by weight of polystyrene, 20 to 70 parts by weight of melamine and 0.05 to 5 parts by weight (expressed in phosphorus) of a phosphorous compound.

The addition of large amounts of melamine and/or melamine cyanurate has a deleterious effect on the mechanical properties of the resultant materials.

SUMMARY OF THE INVENTION

The present invention avoids the use of halogenated flame-proofing compounds and the use of large amounts of melamine or melamine cyanurate which have an unfavorable effect on the mechanical properties of the materials obtained so as to obtain materials with good fire performance and with less degradation of their mechanical properties.

The present invention pertains to the thermoplastic compositions containing at least one alkenyl aromatic hydrocarbon polymer of copolymer and melamine isocyanurate and/or melamine, characterized in that they contain for each 100 parts by weight of a thermoplastic material comprising at least one alkenyl aromatic hydrocarbon polymer or copolymer and, if desired, at least one other thermoplastic or elastomeric resin;
 (a) from 5 to 30 parts by weight of at least one nitrogenous compound selected from among melamine and melamine isocyanurate,
 (b) from 2 to 10 parts by weight of at least one polyol containing at least four hydroxyl functions per molecule, and
 (c) from 0 to 14 parts by weight of at least one organic ester of phosphoric acid.

The present invention also relates to a process for making such compositions and articles having lower combustion rates that are formed of the compositions, as described below.

DETAILED DESCRIPTION

In accordance with the present invention, the term "alkenyl aromatic hydrocarbon polymer" is understood to mean the product of the homopolymerization of an ethylenically unsaturated aromatic hydrocarbon such as styrene, alpha-methylstyrene, the vinyltoluenes, the vinylxylenes and the methylethyl-styrenes.

In accordance with the present invention, the term "alkenyl aromatic hydrocarbon copolymer" is understood to mean the product of the copolymerization of several of the alkenyl aromatic hydrocarbons cited in the previous paragraph or at least one of these hydrocarbons with at least one other copolymerizable monomer such as acrylic acid, methacrylic acid, maleic anhydride, the alkyl (meth)acrylates (the alkyl radical of which contains 1 to 8 carbon atoms), acrylonitrile and 1,3-butadiene.

In accordance with the present invention, the other thermoplastic resin which can, if desired or required be combined with the alkenyl aromatic hydrocarbon polymer or copolymer is understood to mean notably:
 (i) a poly(phenylene oxide),
 (ii) a polyethylene and the copolymers of ethylene and at least one alpha-olefin with 3 to 8 carbon atoms; these latter two resins can be made compatible by means of a grafted or branched ethylene/styrene copolymer in accordance, for example, with British Patent 870,650,
 (iii) the homopolymers and copolymers based on the esters of acrylic or methacrylic acid such as poly(-methyl methacrylate),
 (iv) the copolymers of ethylene and at least one unsaturated polar comonomer such as vinyl acetate, the alkyl (meth)acrylates, acrylic acid, methacrylic acid and maleic anhydride, and/or
 (v) a polycarbonate.

The thermoplastic material can contain the alkenyl aromatic hydrocarbon polymer or copolymer and the thermoplastic resin in any proportions. Advantageously, it will contain from 10 to 90% by weight of the one and from 90 to 10% by weight of the other. Preferably, when the thermoplastic material comprises an ethylene-based polymer or copolymer, the alkenyl aromatic hydrocarbon polymer or copolymer is present in the said material at more than 50% by weight.

In accordance with the present invention, the other elastomeric resin which can, if required, be combined with the alkenyl aromatic hydrocarbon polymer or copolymer is understood to mean notably one or more of the following polymers, with or without grafts of polymerized alkenyl aromatic hydrocarbon: a polyolefinic elastomer such as a terpolymer of ethylene with at least one alpha-olefin having 3 to 6 carbon atoms and at least one diene, particularly the ethylene-propylene-diene terpolymers, with the diene being selected from among the linear or cyclical, conjugated or unconjugated dienes such as, for example butadiene, isoprene, 1,3-pentadiene, 1,4-pentadiene, 1,4-hexadiene, 1,5-hexadiene, 1,9-decadiene, 5-methylene-2-norbornene, 5-vinyl-2-nornbornene, the 2-alkyl-2,5-norbornadienes, 5-ethylidene-2-norbornene, 5-(2-propenyl)-2-norborene, 5-(5-hexenyl)-2-norbornene, 1,5-cyclooctadiene, bicyclo-2,2,2-octa-2,5-diene, cyclopentadiene, 4,7,8,9-tetrahydroindene and isopropylidene tetrahydroindene. Such elastomeric terpolymers which can be employed in accordance with the invention generally comprise between 15 and 60 mol % of the units derived from the propylene and between 0.1 and 20 mol % of the units derived from the diene. The other elastomeric resin can also be a styrene/butadiene rubber, a polydiene rubber such as polybutadiene and polyisoprene, nitrile rubber and ethylene/propylene rubber. Generally the other elastomeric resin is used in an amount less than 20% by weight, preferably between 5 and 15% by weight in relation to the weight of the thermoplastic material.

Melamine or 2,4,6-triamino-1,3,5-triazine is a commercial compound. It is generally prepared by condensation-cyclization of urea with release of $NH_3$ and $CO_2$.

Melamine isocyanurate is obtained by reaction of melamine with cyanuric acid, generally mole to mole, in aqueous solution, at a temperature from circa 90° to 100° C., followed by elimination of the water. This reaction can take place in situ, i.e., during the preparation of the compositions in accordance with the invention by mixing at a temperature generally equal to at least circa 150° C. cyanuric or isocyanuric acid and melamine with the alkenyl aromatic hydrocarbon polymer or copolymer. In accordance with the invention, melamine isocyanurate is also understood to mean melamine cyanurate and mixtures of melamine cyanurate and isocyanurate. The following formula of a complex salt is accepted for melamine isocyanurate:

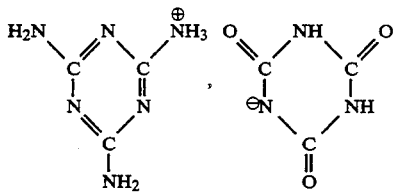

In accordance with the invention, "a polyol containing at least four hydroxyl functions per molecule" is understood to mean any polyol with at least a tetrahydroxylated cyclical or acyclical structure. The hydrocarbon chain can, if required, include at least one heteroatom of oxygen. As examples can be cited the tetrols such as pentaerythritol, erythritol, arabinose, ribose and xylose; the pentols such as adonitol, arabitol, xylitol, fructose, galactose, glucose, mannose and sorbose; the hexols such as dulcitol, mannitol, sorbitol, dipentaerythritol and inositol; the octols such as tripentaerythritol, sucrose, lactose and maltose; and their mixtures.

The organic ester of phosphoric acid is optionally added to the compositions in accordance with the invention with the essential purpose of slightly plasticizing them. This ester can be selected, for example, from among tributylphosphate, tris(2-ethylhexyl)phosphate (or trioctylphosphate), tris-(2-butoxyethyl)phosphate, triphenylphosphate, tricresylphosphate and their mixtures. Preference is given to esters with at least one aromatic ring. When melamine is used as a nitorgenous compound, one adventageously employes an amount of organic ester of phosphoric acid between 1 and 5 parts by weight per 100 parts by weight of thermoplastic material.

The compositions in accordance with the invention may also contain an effective amount, generally between 0.1 and 1% by weight, of ingredients that facilitate implementation of, for example, the extrusion or molding operations and/or that improve their stability. It can be a question of lubricants such as stearic acid and its salts such as zinc stearate, antioxidants such as pentaerythrityl tetrakis (3-(3,5-ditertiobutyl-4-hydroxyphenyl)propionate, octadecyl 3-(3,5-ditertiobutyl-4-hydroxylphenyl) propionate, butylhydroxytoluene, and tris(2-methyl-4-hydroxyl-5-tertiobutylphenyl)butane.

The compositions in accordance with the invention may also contain an effective amount, generally between 0.1 and 0.5% by weight, plasticizers, antistatic agents, light stabilizers such as at least one protective agent against ultraviolet rays selected from among the benzotriazoles and the sterically hindered amines. As benzotriazoles can be cited, for example, 2-(2-hydroxy-5-tertiooctylphenyl) benzotriazole and 2-(2'-hydroxy-5'-methylphenyl) benzotriazole. As sterically hindered amines can be cited, for example, 2,2',6,6'-tetramethyl-4-piperidyl disebacate.

The compositions in accordance with the invention are prepared by mixing the various constituents. If the physical nature of the additives employed allows, i.e., if they are all in the solid state at room temperature, then the mixing can be carried out under dry conditions at room temperature in a mixer into which the various constituents of the composition are introduced in the powder state or as beads for the alkenyl aromatic hydrocarbon (co)polymers. The ready-to-use homogeneous mixture obtained after circa 5 to 20 minutes of mixing is a composition in accordance with the invention.

It is also possible to prepare the compositions in accordance with the invention by mixing the various constituents at a temperature higher than the softening point of the alkenyl aromatic hydrocarbon polymer or copolymer and, if required, the additional thermoplastic resin defined above if it is present, for example, close to 150° to 200° C., in an internal mixture or extruder for 1 to 5 minutes. The compositions are then extruded and then transformed into ready-to-use homogeneous granules.

The compositions in accordance with the invention have applications in various fields upon transformation (as by molding or other conventional shaping technique) into industrial articles intended notably for the automobile and household appliance industries, particularly for audiovisual materials such as rear panels of television sets.

The articles obtained in this manner exhibit a slight or no decrease in their mechanical properties and exhibit a fire performance which is improved in comparison with articles manufactured from compositions that do not contain melamine, melamine isocyanurate or polyol. The combustion rate of the articles obtained from the compositions in accordance with the invention, measured according to the test described below, is appreciably decreased. In addition, the slowed down combustion of the articles does not release halogenated products.

The following examples are presented as nonlimitative illustrations of the invention.

The test employed to measure the fire performance of the compositions is Test 65 CEI 1985 published by the Commission Electrotechnique Internationale [International Electrotechnical Commission] (Geneva). This publication is incorporated in the present description by reference. The bars subjected to this test are obtained by molding compositions that have been extruded and then granulated on a WABASH press at a temperature of circa 200° C. under a pressure of circa 50 bar for a duration of circa 3 minutes. Their dimensions are 127×12.7×2 mm.

The results of the test are expressed in the form of the combustion rate for the horizontal bar in mm/minute. Advantageously the bars prepared from compositions in accordance with the invention have a combustion rate according to this test lower than 40 mm/minute, preferably lower than 35 mm/minute, and even more preferentially lower than 30 mm/minute.

EXAMPLE 1 (COMPARATIVE)

Impact polystyrene beads marketed by NORSOLOR under the name GEDEX ® 240 are extruded and transformed into granules in the presence of 0.5% by weight of an extrusion aid mixture comprised of 50% by weight of zinc stearate(lubricant), 30% by weight of stearic acid (lubricant) and 20% by weight of Irganox ® 1076 (antioxidant marketed by CIBA-GEIGY).

The granules are transformed into bars as described above and the bars are subjected to the combustion test discussed above. The combustion rate measured is equal to 47 mm/minute.

EXAMPLES 2 TO 6

The compositions in accordance with the invention are prepared in two steps. The first step is comprised of mixing at room temperature all of the constituents of the composition so as to obtain a homogeneous mixture which, in the second step, is introduced into an internal mixer with a capacity of 1.1 liters and a rotor rotation rate of 115 rpm, and mixed at a temperature of 175° C. for 3 minutes.

The compositions obtained are cooled under press at a pressure of 10 bars for 3 minutes, resulting in 5 mm thick preforms which are then cut into strips and granulated. The bars required for the combustion test 65 CEI 1985 are prepared as described above from the granules obtained.

The following was used for all of the examples:
(i) as styrene polymer (referred to below as SP), the impact polystyrene beads of Example 1,
(ii) the melamine isocyanurate (referred to below as MI) marketed by NORSOLOR,
(iii) as the polyol with at least four hydroxyl functions per molecule, inositol (referred to below as OL) marketed by BLAUE under the name NF-11,
(iv) as organic ester of phosphoric acid, tris-(2-ethyhexyl)phosphate (referred to below as TOP) marketed by ALDRICH, and
(v) as processing aid, the same mixture as in Example 1 in the same proportions (0.5 part by weight per 100 parts by weight of polystyrene).

Table I below summarizes the amounts of ingredients (omitting the processing aid) in parts by weight per 100 parts by weight of polystyrene as well as the combustion rate (CR) measured on the bars obtained from the compositions and expressed in mm/minute in accordance with test 65 CEI 1985.

TABLE I

| Example | MI | OL | TOP | CR |
|---|---|---|---|---|
| 1 | — | — | — | 47 |

TABLE I-continued

| Example | MI | OL | TOP | CR |
|---|---|---|---|---|
| 2 | 23.8 | 7.9 | — | 22 |
| 3 | 25.2 | 5.6 | 8.4 | 29 |
| 4 | 25.2 | 8.4 | 5.6 | 32 |
| 5 | 15.1 | 5 | 5 | 39 |
| 6 | 24.5 | 2.7 | 8.2 | 37 |

EXAMPLES 7 TO 14

The following were used:
(i) the same impact polystyrene as in Example 1, including the same extrusion aid mixture,
(ii) as nitorgenous compound: the melamine marketed by NORSOLOR (referred to below as M),
(iii) the same polyol as in Examples 2 to 6, and
(iv) as organic ester of phosphoric acid: either the tris(2-ethylhexyl)phosphate(TOP) used for Examples 3 to 6 or triphenylphosphate (TPP) marketed by ALDRICH.

Preparation of the compositions was carried out in accordance with the same processes as in Examples 2 to 6. Table II summarizes the amounts of products used (omitting the processing aid mixture: 0.5 part by weight per 100 parts by weight of polystyrene) in parts by weight per 100 parts by weight of polystyrene and the combustion rate CR measured in the same manner as for Examples 1 to 6.

TABLE II

| Example | M | OL | TOP | TPP | CR |
|---|---|---|---|---|---|
| 7 | 11.5 | 3.4 | — | — | 34 |
| 8 | 11.6 | 3.5 | — | 1.2 | 28 |
| 9 | 11.7 | 3.5 | 1.6 | — | 27 |
| 10 | 11.8 | 3.5 | — | 2.5 | 26 |
| 11 | 11.9 | 3.6 | 3.4 | — | 24 |
| 12 | 12.1 | 3.6 | — | 5.1 | 27 |
| 13 | 12.3 | 3.7 | 7 | — | 27 |
| 14 | 13 | 3.9 | — | 13 | 22 |

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:
1. A thermoplastic composition having a low combustion rate and free of halogen atom-containing combustion retardant agents consisting of at least one alkenyl aromatic hydrocarbon polymer or copolymer and melamine or melamine isocyanurate, and up to 20% by weight of said polymer or copolymer of an elastomeric resin and containing, for each 100 parts by weight of said at least one alkenyl aromatic hydrocarbon polymer or copolymer, and elastomeric resin if present:
   a) from 5 to 30 parts by weight of melamine or melamine isocyanurate, and
   b) from 2 to 10 parts by weight of at least one polyol containing at least 4 hydroxyl functions per molecule.

2. A thermoplastic composition having a low combustion rate and free of halogen atom-containing combustion retardant agents consisting of from 10 to 90% by weight of at least one alkenyl aromatic hydrocarbon polymer or copolymer and melamine or melamine isocyanuyrate, from 90 to 10% by weight of a thermoplastic resin, and up to 20% by weight of said polymer or copolymer of an elastomeric resin and containing for each 100 parts by weight of said at least one alkenyl aromatic hydrocarbon polymer or copolymer and elastomeric resin if present:
   a) from 5 to 30 parts by weight of melamine or melamine isocyanuyrate, and
   b) from 2 to 10 parts by weight of at least one polyol containing at least 4 hydroxyl functions per molecule.

3. The composition of claim 1, wherein an elastomeric resin is included in the amount of 5 and 15% by weight in the thermoplastic material.

4. The composition of claim 1, wherein the polyol is selected from among the tetols, pentols, hexols and octols.

5. The compositions of claim 4, wherein the polyol is inositol.

6. An article having a low combustion rate obtained by shaping of the composition of any one of claims 1 to 5.

7. The article of claim 6, wherein the combustion rate is lower than 40 mm/minute as measured by Test 65 CEI 1985 of the International Electrochemical Commission.

8. The article of claim 7 wherein the combustion rate is lower than 30 mm/minute.

* * * * *

UNITED STATES PATENT AND TRADEMARK OFFICE
CERTIFICATE OF CORRECTION

PATENT NO. : 5,369,157
DATED : November 29, 1994
INVENTOR(S) : Rene Wirth

It is certified that error appears in the above-indentified patent and that said Letters Patent is hereby corrected as shown below:

On the title page, item [54] and column 2:

In the title, change "AROMATAIC" to --AROMATIC--.

Signed and Sealed this

Twenty-fourth Day of January, 1995

Attest:

BRUCE LEHMAN

*Attesting Officer*  *Commissioner of Patents and Trademarks*